(12) United States Patent
Kim et al.

(10) Patent No.: US 11,322,796 B2
(45) Date of Patent: May 3, 2022

(54) RESIN COMPOSITION FOR MANUFACTURING SEPARATOR, PREPARATION METHOD THEREFOR, AND BATTERY COMPRISING SAME

(71) Applicant: LG CHEM, LTD., Seoul (KR)

(72) Inventors: Sungyeon Kim, Daejeon (KR); Tae Geun Noh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 205 days.

(21) Appl. No.: 16/762,274

(22) PCT Filed: Apr. 25, 2019

(86) PCT No.: PCT/KR2019/004990
§ 371 (c)(1),
(2) Date: May 7, 2020

(87) PCT Pub. No.: WO2019/225868
PCT Pub. Date: Nov. 28, 2019

(65) Prior Publication Data
US 2020/0266412 A1    Aug. 20, 2020

(30) Foreign Application Priority Data
May 25, 2018    (KR) ........................ 10-2018-0059724

(51) Int. Cl.
| | |
|---|---|
| *H01M 50/411* | (2021.01) |
| *C08J 5/18* | (2006.01) |
| *H01M 8/0221* | (2016.01) |
| *H01M 8/0226* | (2016.01) |
| *H01M 8/18* | (2006.01) |
| *H01M 50/403* | (2021.01) |

(52) U.S. Cl.
CPC ............. *H01M 50/411* (2021.01); *C08J 5/18* (2013.01); *H01M 8/0221* (2013.01); *H01M 8/0226* (2013.01); *H01M 8/188* (2013.01); *H01M 50/403* (2021.01); *C08J 2300/104* (2013.01)

(58) Field of Classification Search
CPC ............. H01M 50/411; H01M 8/0221; H01M 8/0226; H01M 8/188; H01M 50/503; C08J 5/18; C08J 2300/104
See application file for complete search history.

(56) References Cited

U.S. PATENT DOCUMENTS

| | | |
|---|---|---|
| 2005/0186479 A1 | 8/2005 | Totsuka et al. |
| 2007/0275286 A1 | 11/2007 | Kaliaguine et al. |
| 2009/0117438 A1 | 5/2009 | Saito et al. |

(Continued)

FOREIGN PATENT DOCUMENTS

| | | |
|---|---|---|
| CN | 1661829 A | 8/2005 |
| CN | 104272502 A | 1/2015 |

(Continued)

OTHER PUBLICATIONS

International Search Report for PCT/KR2019/004990 dated Aug. 1, 2019.

(Continued)

*Primary Examiner* — Sarah A. Slifka
(74) *Attorney, Agent, or Firm* — Birch, Stewart, Kolasch & Birch, LLP

(57) ABSTRACT

A resin composition for fabricating a separator which is easy to control viscosity, a method of preparing the same, and a battery including the same, are disclosed.

13 Claims, 1 Drawing Sheet

(56) References Cited

U.S. PATENT DOCUMENTS

| | | |
|---|---|---|
| 2013/0244135 A1 | 9/2013 | Yamane et al. |
| 2013/0252137 A1 | 9/2013 | Zhang et al. |
| 2015/0179996 A1 | 6/2015 | Inaba et al. |
| 2019/0123373 A1 | 4/2019 | Rhee et al. |

FOREIGN PATENT DOCUMENTS

| | | |
|---|---|---|
| JP | 2005-327633 A | 11/2005 |
| JP | 2006-222010 A | 8/2006 |
| JP | 2007-213936 A | 8/2007 |
| JP | 2014-503946 A | 2/2014 |
| JP | 2017-188460 A | 10/2017 |
| KR | 10-0647966 B1 | 11/2006 |
| KR | 10-2008-0047606 A | 5/2008 |
| KR | 10-2009-0039180 A | 4/2009 |
| KR | 10-2010-0084237 A | 7/2010 |
| KR | 10-1178644 B1 | 8/2012 |
| KR | 10-2013-0051227 A | 5/2013 |
| KR | 10-2015-0006509 A | 1/2015 |
| KR | 10-2016-0015768 A | 2/2016 |
| KR | 10-2017-0115354 A | 10/2017 |
| KR | 10-2018-0003906 A | 1/2018 |
| WO | WO 2012/046777 A1 | 4/2012 |

OTHER PUBLICATIONS

Aldebert et al., "Polyelectrotyte Effect in Perfluorosulfonated Ionomer Solutions," Polymer, vol. 36, No. 2, 1995 (Jan. 1, 1995), pp. 431-434, XP055751311.

Extended European Search Report, dated Dec. 9, 2020, for European Application No. 19806690.4.

Fischer, "Properties of Stretched 830 EW Aquivion®," Graduate School of Vanderbilt University, Thesis, Aug. 2012 (Jun. 11, 2012), pp. i-viii, 1-91 (total 100 pages), XP055751333.

Fitzgerald et al., "Synthesis, Properties, and Structure of Sulfonate Ionomers," Journal of Macromolecular Science, Part C: Polymer Reviews, vol. 28, No. 1, 1988 (Jan. 1, 1988), pp. 99-185 (total 89 pages), XP055751324.

Güler et al., "Solution Behavior of Na Sulfonated Polystyrene: Dipole Moment Determinations," British Polymer Journal, vol. 22, No. 3, 1990 (Jan. 1, 1990), pp. 245-248, XP055751329.

Kaiser et al., "Membranes from Polysulfone/N,N-Dimethylacetamide/Water System; Structure and Water Flux," Acta Chim. Slov., vol. 47, 2000 (Jan. 1, 2000), pp. 205-213, XP055750973.

Chinese Office Action for Appl. No. 201980005350.8 dated Mar. 16, 2022 (w/ English translation).

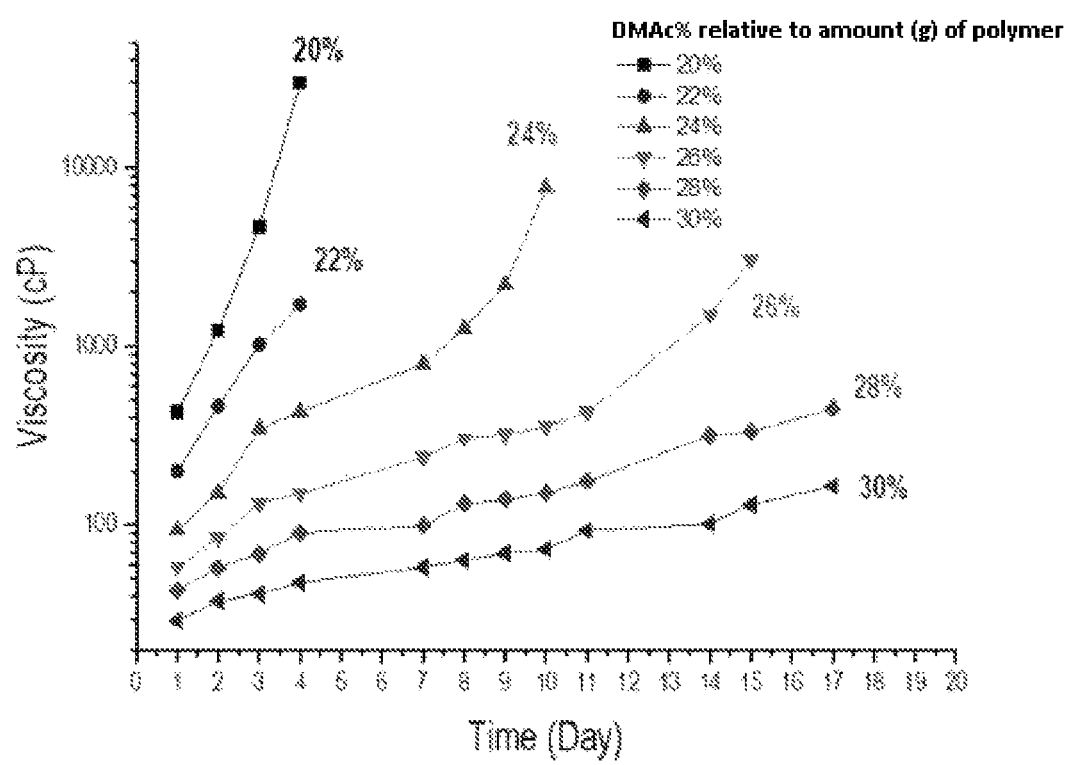

RESIN COMPOSITION FOR MANUFACTURING SEPARATOR, PREPARATION METHOD THEREFOR, AND BATTERY COMPRISING SAME

TECHNICAL FIELD

This application claims the benefit of priority based on Korean Patent Application No. 10-2018-0059724, filed on May 25, 2018, the entire disclosure of which are incorporated herein by reference its entirety.

The present invention relates to a resin composition for fabricating a separator, a method of preparing the same, and a battery comprising the same.

BACKGROUND ART

Electrical power storage technology is an important technology for the efficient utilization of electrical power, the improvement of the capability and reliability of electrical power supply systems, the expanding of the introduction of new renewable energy with a large fluctuation width over time, and the efficient utilization throughout all of the energies, such as energy recovery, and is increasingly demanding for its development potential and social contribution. For this reason, globally, there is a growing need for an electrical power supply scheme that uses new renewable energy sources such as wind power and sunlight, and there is a need for a stable and efficient supply of new renewable energy to meet modern increased energy demand. In the case of the wind power and sunlight energy generation, which are new representative renewable energy sources, since there is a variation in the amount of power generation and output depending on changes in the environment, energy storage devices with large capacity and high efficiency are needed to solve these problems.

Researches on secondary batteries have been actively conducted to adjust the supply-demand balance of semi-autonomous regional power supply system such as micro grid, to appropriately distribute the uneven output of new renewable energy generation such as wind power or solar power generation and to control the influence of voltage and frequency fluctuation caused by difference from existing power system, and there is a growing expectation for the utility of secondary batteries in these fields.

In particular, since the redox flow battery (RFB) is characterized by its ability to be manufactured with large capacity, its low maintenance cost, its ability to operate at room temperature, and its ability to be designed independently of capacity and power respectively, there have recently been a lot of researches on large capacity secondary battery.

Among them, a vanadium redox flow battery (VRFB) using vanadium ion is attracting attention as a next generation energy storage device. However, there is a problem that the capacity of the redox flow battery is lowered due to the crossover phenomenon in which the vanadium ion permeates the separator (ion exchange membrane), and the like. Therefore, in order to solve these problems, researches have been conducted continuously.

In order to solve these problems, a method of increasing the thickness of a separator, a method of replacing an ionic group of a separator, a method of using an additive for crosslinking a polymer forming a separator, and the like are known, but these methods are a method of decreasing the permeability through the structural change of the separator itself, which should be considered together with the problem of reduction of conductivity or durability. In addition, there is a method of changing the operating condition (state of charge: SOC) of the battery, but there is a disadvantage that the efficiency of the battery is reduced. Alternatively, there is a method in which the electrolyte solutions are mixed after the operation for a certain period of time, and then distributed again on halves and the battery is operated, but this method has the inconvenience that the electrolyte solutions must be mixed after a certain period of time or at all times.

PRIOR ART DOCUMENT

[Patent Document]
Japanese Patent Application No. 2006-222010

DISCLOSURE

Technical Problem

It is an object of the present invention to provide a resin composition for fabricating a separator, which can be easily enhanced in viscosity and controlled in viscosity, and thus can easily control the thickness of a large-area separator, wherein the composition does not remain in the separator when drying the separator and thus does not affect the performance of the battery.

In addition, it is another object of the present invention to provide a method of fabricating a separator using the resin composition for fabricating the separator.

In addition, it is another object of the present invention to provide a separator comprising the resin composition for fabricating the separator and a battery comprising the separator.

Technical Solution

In order to achieve the above objects, the present invention provides a resin composition for fabricating a separator comprising: a sulfonated polymer, an amide group-containing organic solvent, and water, wherein the amide group-containing organic solvent is contained in an amount of 20 to 30 parts by weight relative to 100 parts by weight of the sulfonated polymer.

In addition, the present invention provides a method for preparing a resin composition for fabricating a separator, comprising steps of:

(a) preparing a mixture of a sulfonated polymer and water; and (b) adding 20 to 30 parts by weight of an amide group-containing organic solvent relative to 100 parts by weight of the sulfonated polymer.

In addition, the present invention provides a method for fabricating a separator comprising steps of:

(a) shaping a sheet-shaped separator using the resin composition for fabricating the separator according to the present invention; and (b) after the shaping in step (a), heating to 70 to 220° C. to remove the amide group-containing organic solvent.

In addition, the present invention provides a battery comprising a negative electrode; a positive electrode; and a separator disposed between the negative electrode and the positive electrode, wherein the separator is fabricated from the resin composition for fabricating the separator of the present invention.

Advantageous Effects

The resin composition for fabricating the separator of the present invention has the effect of being easily enhanced and controlled in viscosity, and thus easily controlling the thickness of the large-area separator.

In addition, the resin composition for fabricating the separator of the present invention does not remain in the separator after drying and thus does not affect the performance of the battery.

DESCRIPTION OF DRAWINGS

The FIGURE is a graph of viscosity according to the storage duration of a resin composition for fabricating a separator.

BEST MODE

Hereinafter, the present invention will be described in more detail.

A separator requires high hydrogen ion conductivity, mechanical strength, and durability. In addition, the thickness of the separator depends on the viscosity of a resin composition for fabricating a separator. In the case of a conventional resin composition for fabricating a separator, the viscosity of the composition was improved by adding a cross-linking induction monomer or a thickener for viscosity control. However, there is a problem that after drying, the monomer or thickener remains in the separator, which affects the performance of the battery, and the hydrogen ion conductivity of the separator is lowered due to the combination of the sulfonic acid and the monomer.

Therefore, the present invention provides a resin composition for fabricating a separator which does not remain in the separator after drying and thus does not affect the performance of the battery, and is improved and easily controlled in viscosity.

That is, the present invention relates to a resin composition for fabricating a separator comprising: a sulfonated polymer, an amide group-containing organic solvent, and water, wherein the amide group-containing organic solvent is contained in an amount of 20 to 30 parts by weight relative to 100 parts by weight of the sulfonated polymer.

The sulfonated polymer is an ion-exchangeable polymer, and in the present invention, can be at least one selected from homo copolymer, alternating copolymer, random copolymer, block copolymer, multiblock copolymer, or graft copolymer which is selected from the group consisting of perfluorosulfonic acid-based polymers, sulfonated polyarylene ether-based polymers, sulfonated polyether ketone-based polymers, sulfonated polyetheretherketone-based polymers, sulfonated polyamide-based polymers, sulfonated polyimide-based polymers, sulfonated polyphosphazene-based polymers, sulfonated polystyrene-based polymers, and radiation-polymerized sulfonated low-density polyethylene-g-polystyrene-based polymers.

In addition, the sulfonated polymer may most preferably comprise perfluorosulfonic acid-based polymers.

The sulfonated polymer is contained in an amount of 20 to 30% by weight, preferably 26 to 30% by weight based on the total weight of the resin composition for fabricating a separator of the present invention. If the sulfonated polymer is contained in an amount of less than 20% by weight, the viscosity rapidly increases to more than 7000 cps within one day, and then gelation occurs within 2 days, thereby making it impossible to fabricate a separator. If the amount of the sulfonated polymer exceeds 30% by weight, the effect of enhancing the viscosity is remarkably reduced.

In the resin composition for fabricating the separator of the present invention, the amide group-containing organic solvent serves to control the viscosity of the composition. In general, the thickness of the separator depends on the viscosity of the resin composition for fabricating the separator. In the present invention, the separator having the desired thickness can be obtained by controlling the viscosity of the resin composition for fabricating the separator using the amide group-containing organic solvent.

Specifically, the amide bond of the organic solvent and the sulfonic acid group of the sulfonated polymer may form a hydrogen bond to enhance the viscosity of the composition, and the viscosity of the resin composition for fabricating the separator can be easily controlled by controlling the content of the amide group-containing organic solvent. Also, the phase separation of hydrophilic and hydrophobic phases occurs well due to the hydrogen bond, and thus the ion conductivity of the separator can be improved.

The amide group-containing organic solvent comprises at least one selected from the group consisting of dimethylacetamide, dimethylformamide, N-methyl-2-pyrrolidone, N-methylformamide, N-vinylacetamide, N-vinylpyrrolidone, formamide, and 2-pyrrolidone. The boiling points of dimethylacetamide and dimethylformamide are 165° C. and 153° C., respectively, which are relatively low. Accordingly, if the resin composition for fabricating the separator is dried at no less than the above-mentioned temperatures, since they do not remain in the sulfonated polymer after drying and do not affect the performance of the battery, it is preferable to comprise at least one selected from the group consisting of dimethylacetamide and dimethylformamide as the amide group-containing organic solvent.

In addition, the amide group-containing organic solvent is contained in an amount of 20 to 30 parts by weight, preferably 26 to 30 parts by weight, relative to 100 parts by weight of the sulfonated polymer. If the amide group-containing organic solvent is contained in an amount of less than 20 parts by weight, the polymer solution after the preparation is rapidly gelated, thereby resulting in poor processability. If the amount of the amide group-containing organic solvent is more than 30 parts by weight, the concentration of the sulfonated polymer dissolved in the water is decreased, and thus the viscosity controlling effect cannot be expected.

In addition, the molar ratio of the sulfonic acid group of the sulfonated polymer to the amide group of the amide group-containing organic solvent is 1:1.13 to 1:7, preferably 1:1.46 to 1:1.7. Within this range, the viscosity effect of the resin composition can be shown.

In addition, the amide group-containing organic solvent is contained in an amount of 4 to 9% by weight, preferably 5.2 to 9% by weight relative to the total weight of the resin composition for fabricating the separator of the present invention. If the amide group-containing organic solvent is contained in an amount of less than 4% by weight, the polymer solution immediately after the preparation is gelated, and thus the separator cannot be fabricated. If the amide group-containing organic solvent is more than 9% by weight, as the concentration of the sulfonated polymer dissolved in water is decreased, the viscosity is decreased together and the viscosity increasing effect with time does not exhibit.

The water in the resin composition for fabricating the separator of the present invention is used to dissolve the sulfonated polymer, and is contained in the remaining amount so that the total weight of the composition of the present invention reaches 100% by weight, and specifically is contained in an amount of 61 to 76% by weight.

In addition, the viscosity of the resin composition for fabricating the separator of the present invention is 100 to 3000 cps, preferably 100 to 300 cps, and more preferably 150 to 200 cps. The viscosity depends on the content of the amide group-containing organic solvent as described above. That is, the viscosity of the resin composition for fabricating the separator of the present invention can be controlled by adjusting the content of the amide group-containing organic solvent.

In addition, the present invention relates to a method for fabricating a resin composition for fabricating a separator, comprising the steps of:

(a) preparing a mixture of a sulfonated polymer and water; and (b) adding 20 to 30 parts by weight of an amide group-containing organic solvent relative to 100 parts by weight of the sulfonated polymer.

The kind and content of the sulfonated polymer and the amide group-containing organic solvent and the content of water are the same as described above.

Also, since the viscosity of the composition of the present invention can be adjusted according to the storage duration, the desired viscosity can be obtained by checking the change of the viscosity with time while the resin composition prepared in step (b) is stored for 1 to 17 days.

Therefore, the present invention can easily control the viscosity of the composition by controlling the content of the amide group-containing organic solvent as well as the storage period of the composition, so that the composition having a desired viscosity can be produced, thereby obtaining a separator having a desired thickness.

If a separator is fabricated using the resin composition for fabricating the separator of the present invention, a separator having a thickness of 30 to 60 µm can be obtained. If the thickness of the separator is less than 30 µm, since the thickness of the separator is too thin, a cross-over phenomenon occurs in which the electrolytes of the negative electrode and the positive electrode of the battery pass through the separator and are mixed with each other, which causes a problem that the capacity of the battery is reduced and the current efficiency among the efficiencies is particularly reduced. Also, if the thickness of the separator exceeds 60 µm, the thickness of the separator acts as a resistor to lower the voltage efficiency and thus reduce the performance of the battery. Therefore, if a separator is fabricated using the resin composition for fabricating the separator of the present invention, since the separator can have a thickness within the above range, it is possible to obtain a separator with a high efficiency while improving the capacity of the battery.

In addition, the present invention relates to a method for fabricating a separator comprising steps of:

(a) shaping a sheet-shaped separator using the resin composition for fabricating the separator of the present invention; and (b) after the shaping in step (a), heating to 70 to 220° C. to remove the amide group-containing organic solvent.

The method of shaping the sheet-separated separator in step (a) may be performed by a variety of methods and apparatuses. In the present invention, the method is not particularly limited, but may preferably be performed by a roll-to-roll process to fabricate a large-area separator.

When fabricating the separator by the roll-to-roll method, the thickness of the separator depends on the viscosity of the resin composition for fabricating the separator. As described above, since the viscosity of the resin composition for fabricating a separator of the present invention can be controlled, when fabricating the separator by the roll-to-roll method, the thickness of the separator can be controlled and a large-area separator can be fabricated.

The heating temperature in step (b) is 70 to 220° C., preferably 180 to 220° C., and the heating is preferably performed in a circulating oven.

If the heating temperature is lower than 70° C., since the organic solvent cannot be completely removed, the performance of the battery may be affected when applying the separator to the battery. If the heating temperature is higher than 220° C., there arise problems of browning and reduction of ion conductivity due to the induction of crosslinking by sulfonic acid in the polymer.

The heating in step (b) may be performed at 80° C. for 3 hours, at 180° C. for 15 hours, and at 200° C. for 4 minutes, but is not limited thereto.

In addition, the present invention relates to a battery comprising: a negative electrode; a positive electrode; and a separator disposed between the negative electrode and the positive electrode, wherein the separator is fabricated from the resin composition for fabricating the separator of the present invention.

The battery is not limited in its kind as long as it is a battery to which the separator of the present invention can be applied. For example, the battery may comprise at least one selected from the group consisting of a water treatment separator, a redox flow battery, a lithium ion battery, a hydrogen fuel battery, and a chloro-alkali battery, and preferably may be a redox flow battery, more preferably a vanadium redox flow battery.

Hereinafter, preferred embodiments of the present invention will be described in detail with reference to the accompanying drawings. These drawings may be embodied in various different forms as an embodiment for explaining the present invention, and are not limited thereto.

Preparation of Resin Composition for Fabricating Separator

Examples 1-6 and Comparative Examples 1-5

Resin compositions for fabricating a separator of Examples 1 to 6 and Comparative Examples 1 to 5 were prepared with the ingredients and contents shown in Table 1 below.

The Aquivion D98-25S product with a chemical equivalent weight (EW) of 980 from Solvay company was used as a sulfonated polymer and dimethylacetamide (DMAc) was used as an amide group-containing organic solvent.

TABLE 1

| | Aquivion (g) | DMAc (g) | Water (g) | Content of DMAc relative to 100 parts by weight of Aquivion (Parts by weight) | Number of moles of amide group of organic solvent to sulfonic acid group in polymer |
|---|---|---|---|---|---|
| Comparative Example 1 | 12.5 | 0 | 37.5 | 0 | 0 |
| Comparative Example 2 | 12.5 | 1 | 37.5 | 8 | 0.45 |
| Comparative Example 3 | 12.5 | 1.25 | 37.5 | 10 | 0.56 |
| Comparative Example 4 | 12.5 | 1.875 | 37.5 | 15 | 0.84 |
| Example 1 | 12.5 | 2.5 | 37.5 | 20 | 1.13 |
| Example 2 | 12.5 | 2.75 | 37.5 | 22 | 1.24 |
| Example 3 | 12.5 | 3 | 37.5 | 24 | 1.35 |
| Example 4 | 12.5 | 3.25 | 37.5 | 26 | 1.46 |
| Example 5 | 12.5 | 3.5 | 37.5 | 28 | 1.58 |
| Example 6 | 12.5 | 3.75 | 37.5 | 30 | 1.69 |
| Comparative Example 5 | 12.5 | 5 | 37.5 | 40 | 2.25 |

Experimental Example 1: Measurement of Viscosity of Composition According to Storage Duration The viscosities of the resin compositions for fabricating the separator prepared in Examples 1 to 6 and Comparative Examples 1 to 5 were measured according to the storage period, and the results are shown in Table 2 below.

The viscosity was measured with a viscometer (Digital Rotation Viscometer (DV2TLV), BROOKFIELD) at room temperature (25° C.) and 40% humidity.

TABLE 2

| | 1 day | 2 days | 3 days | 4 days | 9 days | 10 days | 11 days | 14 days | 15 days | 17 days |
|---|---|---|---|---|---|---|---|---|---|---|
| Comparative Example1 | | | | | 9.42 (Unchanged) | | | | | |
| Comparative Example2 | 1433 | 4443 | | | Not measurable (Gelated) | | | | | |
| Comparative Example3 | | | | | Not measurable (Gelated) | | | | | |
| Comparative Example4 | 7070 | | | | Not measurable (Gelated) | | | | | |
| Example1 | 429 | 1226 | 4686 | | Not measurable (Gelated) | | | | | |
| Example2 | 200.2 | 464.5 | 1022 | 1721 | Not measurable (Gelated) | | | | | |
| Example3 | 94.05 | 152 | 346.1 | 432 | 2200 | 7729 | Not measurable (Gelated) | | | |
| Example4 | 58.2 | 85.2 | 132.5 | 150 | 320 | 353.6 | 428.8 | 1500 | 3053 | Not measurable (Gelated) |
| Example5 | 43.35 | 50.72 | 69.52 | 90.72 | 139 | 151.5 | 176 | 318 | 332.3 | 448.5 |
| Example6 | 29.22 | 37.67 | 41.2 | 47.67 | 69.3 | 73.35 | 93.2 | 101.8 | 130 | 165.9 |
| Comparative Example5 | 15.45 | 18.15 | 19.35 | 16.5 | 18.3 | 17.8 | 17.1 | 16.5 | 17.5 | 15.5 |

From the results shown in the above Table 2, it can be seen that the resin compositions for fabricating the separator of Examples 1 to 6 of the present invention are superior in viscosity enhancement and viscosity control effect to the resin compositions for fabricating the separator of Comparative Examples 1 to 5. In addition, it can be seen that the desired viscosity according to the storage duration can be obtained, and thus a separator having a desired thickness can be manufactured.

On the other hand, it can be seen that the resin composition for fabricating the separator of Comparative Example 1 did not contain the amide group-containing organic solvent, and thus did not exhibit viscosity enhancement and viscosity control effects, and the resin compositions for fabricating the separator of Comparative Examples 2 to 4 containing less than 20 parts by weight of the amide group-containing organic solvent relative to 100 parts by weight of the sulfonated polymer is too high in viscosity and thus is gelated quickly. In addition, the resin composition for fabricating the separator of Comparative Example 5 containing more than 30 parts by weight of the amide group-containing organic solvent relative to 100 parts by weight of the sulfonated polymer did not exhibit viscosity enhancement and viscosity control effects.

Experimental Example 2: Measurement of Thickness of Separator

Separators were prepared using the resin compositions for fabricating the separator prepared in Example 1, Example 6, Comparative Examples 1 to 3, and Comparative Example 5.

In the case of Example 1, the resin composition for fabricating the separator was used after 1 day of preparation. In the case of Example 6, the resin composition for fabricating the separator was used after 17 days of preparation. In the case of Comparative Example 2, the resin composition for fabricating the separator was used after 2 days of preparation.

Specifically, each of the compositions was formed into a film having a thickness of 50 μm using a roll-to-roll machine, followed by vacuum drying at 80° C. for 3 hours, 180° C. for 15 hours and 200° C. for 4 minutes in a circulating oven, respectively to prepare a separator.

The thicknesses of the separators fabricated above are shown in Table 3 below.

TABLE 3

| | Thickness of separator (μm) |
|---|---|
| Example 1 | 53 |
| Example 6 | 41 |
| Comparative Example 1 | 9 |
| Comparative Example 2 | 150 (Surface unevenness) |
| Comparative Example 3 | Impossible to fabricate separator |
| Comparative Example 5 | 18 |

From the results shown in Table 3, it can be seen that the resin compositions for fabricating the separator in Examples 1 and 6 can control the thickness of the separator by adjusting their viscosities, and that a separator having a desired thickness can be fabricated according to the desired viscosity.

When the composition has a viscosity of 100 to 300 cps, preferably 150 to 200 cps, a separator having a thickness of 30 to 60 μm can be fabricated. If the separator with the above thickness is applied to a battery, a battery exhibiting high efficiency can be obtained while improving the capacity of the battery. Therefore, by adjusting the viscosity of the resin composition for preparing the separator according to the present invention, a separator capable of exhibiting excellent battery performance can be fabricated.

On the other hand, the resin compositions for fabricating the separator of Comparative Examples 1 and 5 had a very low viscosity, and thus the thickness of the separator was too thin to be used as a separator. In the case of the resin composition for fabricating the separator of Comparative Example 2, the thickness of the separator was relatively thick and the separator with nonuniform surface was prepared and thus could not be used as a separator. In addition, the resin composition for fabricating the separator of Comparative Example 3 was impossible to fabricate a separator due to gelation.

The invention claimed is:

1. A resin composition for fabricating a separator comprising:
   a sulfonated polymer;
   an amide group-containing organic solvent; and
   water,
   wherein the amide group-containing organic solvent is present in an amount of 20 parts to 30 parts by weight relative to 100 parts by weight of the sulfonated polymer.

2. The resin composition for fabricating the separator of claim 1, wherein the amide group-containing organic solvent comprises at least one selected from the group consisting of dimethylacetamide, dimethylformamide, N-methyl-2-pyrrolidone, N-methylformamide, N-vinylacetamide, N-vinylpyrrolidone, formamide, and 2-pyrrolidone.

3. The resin composition for fabricating the separator of claim 2, wherein the amide group-containing organic solvent comprises at least one selected from the group consisting of dimethylacetamide and dimethylformamide.

4. The resin composition for fabricating the separator of claim 1, wherein the sulfonated polymer comprises a perfluorosulfonic acid-based polymer.

5. The resin composition for fabricating the separator of claim 1, wherein a molar ratio of a sulfonic acid group of the sulfonated polymer to the amide group of the amide group-containing organic solvent is 1:1.13 to 1:1.7.

6. The resin composition for fabricating the separator of claim 1, wherein a viscosity of the resin composition for fabricating the separator is 100 cps to 3000 cps.

7. The resin composition for fabricating the separator of claim 1, wherein the resin composition for fabricating the separator comprises 20% by weight to 30% by weight of the sulfonated polymer, 4% by weight to 9% by weight of the amide group-containing organic solvent, and 61% by weight to 76% by weight of water based on a total weight of the resin composition.

8. A method for preparing a resin composition for fabricating a separator, comprising steps of:
   (a) preparing a mixture of a sulfonated polymer and water; and
   (b) adding, to the mixture of (a), 20 parts to 30 parts by weight of an amide group-containing organic solvent relative to 100 parts by weight of the sulfonated polymer.

9. The method for preparing the resin composition for fabricating the separator of claim 8, wherein a desired viscosity is obtained by checking a change of the viscosity with time while the resin composition prepared in step (b) is stored for 1 day to 17 days.

10. A method for fabricating a separator comprising steps of:
   (a) shaping a sheet-shaped separator using the resin composition for fabricating the separator of claim 1; and
   (b) after the shaping in step (a), heating to 70° C. to 220° C. to remove the amide group-containing organic solvent.

11. The method for fabricating the separator of claim 10, wherein the step of shaping the sheet-shaped separator is performed by a roll to roll process.

12. A battery comprising:
   a negative electrode;
   a positive electrode; and
   a separator disposed between the negative electrode and the positive electrode,
   wherein the separator is fabricated from the resin composition for fabricating the separator of claim 1.

13. The battery of claim 12, wherein the battery is a vanadium redox flow battery.

* * * * *